July 10, 1962 K. W. MAYHERCY 3,043,356
TIRE--TRACTION DEVICE
Filed Oct. 13, 1961
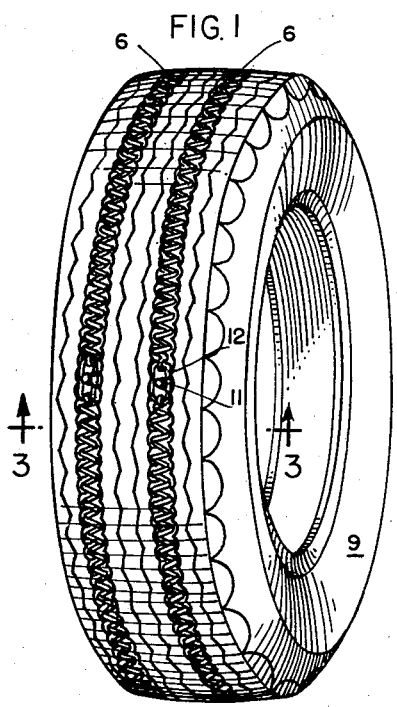
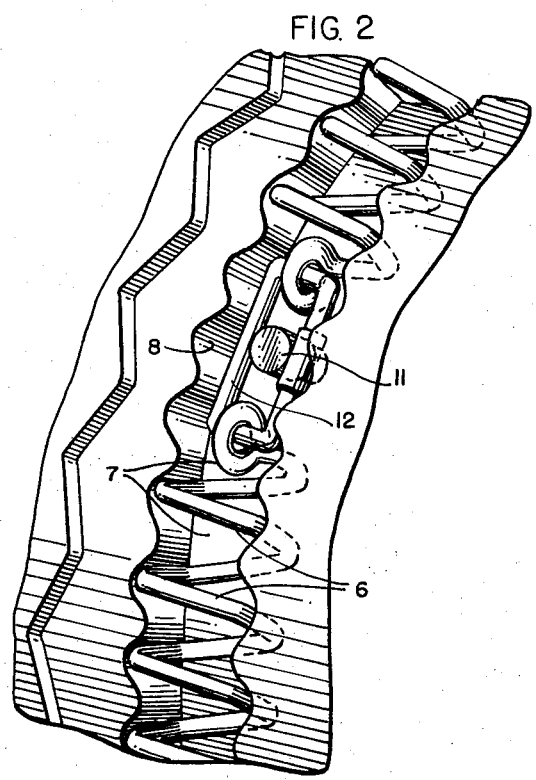
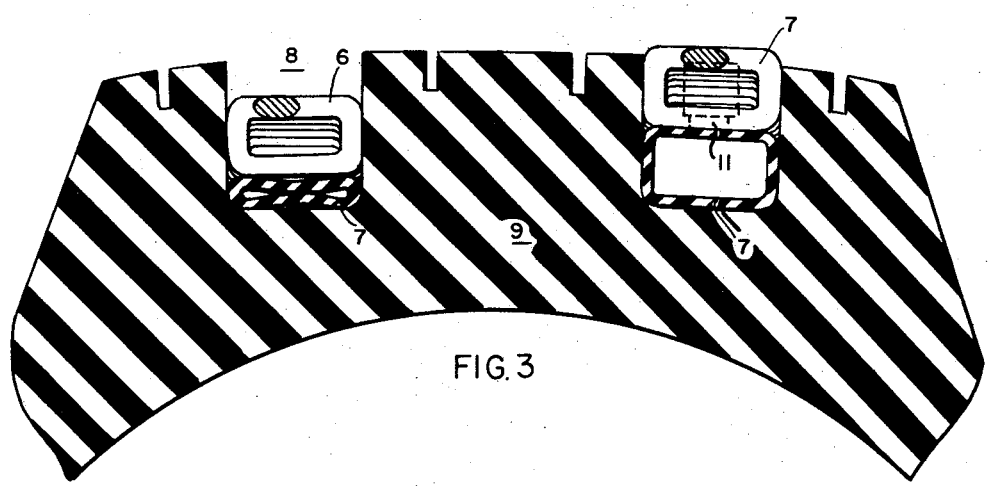
INVENTOR:
KENNETH W. MAYHERCY
BY
ATT'YS

United States Patent Office 3,043,356
Patented July 10, 1962

3,043,356
TIRE-TRACTION DEVICE
Kenneth W. Mayhercy, St. Paul, Minn.
(1034 E. Colfax, Denver 18, Colo.)
Filed Oct. 13, 1961, Ser. No. 144,997
3 Claims. (Cl. 152—208)

This invention relates to improvements in traction-increasing devices for vehicle tires.

The main objects of this invention are to provide an improved traction-increasing device for vehicle tires; to provide an improved vehicle tire having extensive tread sections for increasing tire traction; to provide an improved vehicle tire having annular elements embracively embedded in the tread section normally disposed below the traction surface subject to circumferential expansion outwardly of the normal traction surface for a temporary or as-needed increase in the tractional capacity of the tire; to provide an improved traction-increasing tire device of this kind structured to fit in a circumferential groove in the tread section so as to be restrained against circumferential shifting on the tire; to provide an improved form of extensible annulus superimposed on an inflatable ring and embraced within the tread section of a tire subject to extension of the annulus outwardly of the traction surface of the tire to increase the tractional capacity thereof; and to provide an improved traction-increasing device of this kind adapted either for incorporation into a tire at the time of its manufacture or for placing in a tire having a tread-section groove of a form and depth suitable to seat the device.

In the adaptation shown in the accompanying drawings:

FIGURE 1 is a perspective view of a tread section of a vehicle tire equipped with a traction-increasing device constructed in accordance with this invention;

FIG. 2 is an enlarged, fragmentary perspective of a tire tread-section showing the irregular-shaped side-wall contour of the tread-section grooves within which this improved traction-increasing device is seated; and FIG. 3 is a further-enlarged, transverse sectional view of the tread section of tire embodying an inflatable ring and extensible annulus constructed in accordance with this invention, one of the ring-supported annuli being extended, the other retracted.

A traction-increasing device and vehicle tire embodying the present invention comprises an annulus 6 and an embraced inflatable ring 7 adapted for seating in one or more grooves 8 in the vehicle tire 9.

The annulus 6 is formed from the joined ends of a suitable length of conventional helical spring. The spring must be formed of comparatively heavy-gage, high-resiliency wire. The wire could be either circular in cross-section or non-circular. Likewise, the shape of the spring forming the annulus could be spherical or oblong in cross-section. The latter form is shown herein since a maximum flat portion of the annulus could be exposed for tractional contact with the roadway when the annulus is operationally extended.

The metal forming the spring annulus 6 preferably should be non-abrasive. It should be so structured that in its normally-contracted state in the tire 9 the annulus 6 will be under enough tension to maintain the ring 7 collapsed and dispose the outer periphery of the annulus 6 below the tread surface 10 of the tire 9, even after the tire has been subjected to considerable wear.

The ends of the spring, forming the annulus 6, would be secured together in any acceptable manner. This might be by bonding the ends together or it might be accomplished by the use of an easily-attached and -released latch, such as shown at 12.

The ring 7 would be dimensioned, in cross-section and circumferentially, to be sufficiently stretchable to slip over the tire 9 into the groove 8 and collapse flat without wrinkles.

Since such a ring 7 must withstand excessive strains, when inflated to extend the annulus 6 into traction-increasing position on the tire 9, the ring 7 is structured from a tough, reinforced composition that will preclude any tendency to balloon when expanded into full round. Also, the material forming the ring 7 is structured to have a capacity, when inflated to extend the annulus 6, to absorb severe shocks to which the annulus 6 will be subjected in situations requiring the increased tractional capacity for the tire 9.

The ring 7 mounts a conventional air-inlet flexible valve-stem 11. This would be positioned and of a length to extend up through the latch 12 but short of the tread surface 10 of the tire 9, as shown in FIG. 3. Any source of air under pressure may be used to inflate the ring 7.

A traction-increasing device as herein shown, may be structured either to be placed on a tire 9 already produced or incorporated into a tire in the process of its production. As here shown, the general preference would be for two such devices embedded in a pair of the grooves 8 in a tire 9. However, in certain types of tires a single device or more than two such devices might be used.

There are tires currently on the market that have grooves 8 of a dimension and contour that would make possible the structuring of an annulus 6 and ring 7 for ready seating in the tread-section grooves 8 of the tire. For instance, truck tires and so-called "snow" type tires are normally provided with wide, deep grooved treads. On the other hand, it may be imperative to coordinate the production, of a tire and such a traction-increasing device, to secure the best results in the functioning of the device for traction-increasing purposes.

In either situation, the grooves 8, wherein the annulus 6 and ring 7 are to be embedded or seated, be of a considerable depth and the opposed side walls defining the groove 8 have a sinuous contour, as shown in FIG. 2. Such sinuousity should approximate if not actually match the circumferential spacing of the convolutions of the annulus 6. This is desirable to insure the seating of the diametrically-opposite portions of annulus convolutions in the opposed depressions of the sinuous walls of the tire 9. Especially should this be the condition when the annulus 6 is extended circumferentially outward of the tread surface 10 of the tire 9 to increase its tractional capacity, and prevent rotation of the annulus 6 when the device is being used as an anti-skid and/or traction device.

Although but one specific embodiment of this invention is herein shown and described, it will be understood that numerous details of the construction shown may be altered or omitted without departing from the spirit of the invention as defined by the following claims.

I claim:

1. A vehicle tire having a circumferentially-open groove in the tread section defined by opposed sinuous walls, a helically-coiled annulus seated in the groove normally below the traction surface of the tire and held against circular shifting in the groove by the engagement of the annulus convolutions with the groove-defining sinuous-walls, and normally-collapsed inflatable-means interposed between the base of the groove and said annulus adapted to be inflated to extend the annulus circumferentially outward of the tread surface of the tire to increase the tractional capacity thereof.

2. A vehicle tire having a circumferentially-open groove in the tread section defined by opposed-sinuous walls, a helically-coiled annulus, a collapsed inflatable ring seated in said groove normally below the traction surface of the tire and held against circular shifting in the groove by the engagement of the annulus convolutions with the groove-defining sinuous-walls, said annulus embracing said ring, and means for inflating the ring to expand the annulus circumferentially outward of the tread surface of the tire to increase the tractional capacity thereof.

3. The device according to claim 2 wherein said ring is provided with an air inlet stem extending outwardly through the annulus adjacent the tread surface of the tire to permit the inflation of the ring to extend the annulus circumferentially outward of the tread surface of the tire to increase the tractional capacity thereof.

References Cited in the file of this patent

UNITED STATES PATENTS

| | | |
|---|---|---|
| 2,708,470 | Gramelspacher | May 17, 1955 |
| 2,835,302 | Gedge | May 20, 1958 |

FOREIGN PATENTS

| | | |
|---|---|---|
| 189,427 | Germany | Sept. 17, 1907 |
| 1,017,483 | Germany | Oct. 10, 1957 |